United States Patent [19]
Ikeda

[11] Patent Number: 5,534,670
[45] Date of Patent: Jul. 9, 1996

[54] MUFFLER FOR BOOSTER

[75] Inventor: Masahiro Ikeda, Saitama-ken, Japan

[73] Assignee: Jidosha Kiki Co., Ltd., Tokyo, Japan

[21] Appl. No.: 394,577

[22] Filed: Feb. 27, 1995

[30] Foreign Application Priority Data

Mar. 31, 1994 [JP] Japan ................................. 6-085789

[51] Int. Cl.⁶ .................................................. F01N 3/02
[52] U.S. Cl. ......................................... 181/230; 91/376 R
[58] Field of Search ................................... 181/230, 229, 181/211, 212; 91/376 R

[56]       References Cited

U.S. PATENT DOCUMENTS

| 4,716,814 | 1/1988 | Yamakoshi | 91/376 R |
| 5,433,135 | 7/1995 | Watanabe | 91/376 R |

FOREIGN PATENT DOCUMENTS 1-70672   5/1989   Japan .
6-87123  12/1994   Japan .

*Primary Examiner*—Khanh Dang
*Attorney, Agent, or Firm*—Flynn, Thiel, Boutell & Tanis

[57]          ABSTRACT

A muffler for booster, as may be used in a brake of an automobile or the like, is provided for reducing the generation of sounds during the suction stroke when a pressure fluid is introduced into a variable pressure chamber. An uneven surface is defined on the internal surface of a tubular portion of a shell in a region which is located opposite to an opening of a variable pressure passage when the booster is inoperative. With this construction, as the atmosphere is introduced into the variable pressure chamber through the opening of the variable pressure passage, the impingement of the atmosphere against the uneven surface is effective to reduce the generation of sounds during the suction stroke. This occurs without using any sound absorbing material, and hence does not degrade the response of the booster.

8 Claims, 3 Drawing Sheets

MUFFLER FOR BOOSTER

FIELD OF THE INVENTION

The invention relates to a booster as may be used in a brake of an automobile or the like, and more particularly, to a muffler for booster which reduces the generation of sounds during the suction stroke when a pressure fluid is introduced into a variable pressure chamber.

DESCRIPTION OF THE PRIOR ART

A booster is well known in the art which comprises a tubular portion formed in a shell, a tubular valve body slidably disposed within the shell and which has its terminal end projecting externally through the tubular portion of the shell, a valve mechanism disposed within the valve body, a constant pressure passage providing a communication between the valve mechanism and a constant pressure chamber formed in the shell, a variable pressure passage for providing a communication between the valve mechanism and a variable pressure chamber formed in the shell, and a pressure passage for providing a communication between the valve mechanism and a source of pressure fluid which is located externally of the shell, the variable pressure passage having an opening into the variable pressure chamber which is disposed so as to be opposite to the internal surface of the tubular portion of the shell when the booster is inoperative.

When the booster mentioned above is inoperative, the valve mechanism closes the pressure passage and provides a communication between the constant and the variable pressure passage, whereby the both chambers assume an equal pressure, resulting in an inoperative condition of the booster.

By contrast, when the booster is operated, and a pedal is depressed to switch the valve mechanism, the communication between the constant and the variable pressure passage is interrupted while the pressure passage communicates with the variable pressure chamber. As a consequence, a pressure fluid is introduced into the variable pressure chamber through the pressure passage and the variable pressure passage to produce a pressure differential between the constant and the variable pressure chamber to actuate the booster.

When the booster is operated, sounds may be produced during the suction stroke when the pressure fluid is introduced from the pressure passage into the variable pressure chamber. To accommodate for this, a prior art practice has been to dispose a sound absorbing material adjacent to the inlet of the pressure passage to present a resistance to the passage of the pressure fluid therethrough. In this manner, the rate at which the pressure fluid is introduced into the variable pressure chamber is reduced to prevent the generation of sounds during the suction stroke. However, in such muffler, the provision of the sound absorbing material within the pressure passage presents a resistance to the passage of the pressure fluid therethrough, thereby disadvantageously degrading the response of the booster when compared with an arrangement having no absorbing material.

SUMMARY OF THE INVENTION

The invention relates to a booster in which a variable pressure passage has an opening into a variable pressure chamber, which is located opposite to the internal surface of a tubular portion of the shell when the booster is inoperative. The invention is made on the basis of a finding that a main contribution to the generation of sounds during the suction stroke results from the impingement of the pressure fluid against the internal surface of a smooth tubular portion of the shell as it flows into the variable pressure chamber from the variable pressure passage when the booster is operated. Accordingly, the invention provides a muffler for booster which is capable of reducing the generation of sounds during the suction stroke, without sacrificing the response of the booster. At this end, in accordance with the invention, in a booster in which an opening of the variable pressure passage into the variable pressure chamber which is located opposite to the internal surface of the tubular portion of the shell when the booster is inoperative, the internal surface of the tubular portion of the shell is formed with an uneven surface.

With this muffler, upon impingement of the pressure fluid which flows from the variable pressure passage into the variable pressure chamber against the internal surface of the tubular portion of the shell, the uneven surface, which defines the internal surface, is effective to reduce the generation of sounds as a result of impingement, thus advantageously suppressing the generation of sounds during the suction stroke. Since the uneven surface presents no resistance to the passage of the pressure fluid in distinction to the provision of the sound absorbing material disposed within the pressure passage as has been done in the prior art, no sacrificing of the response occurs.

Above and other objects, features and advantages of the invention will become apparent from the following description of several embodiments thereof with reference to the drawings.

DETAILED DESCRIPTION OF EMBODIMENTS

Figure 1:
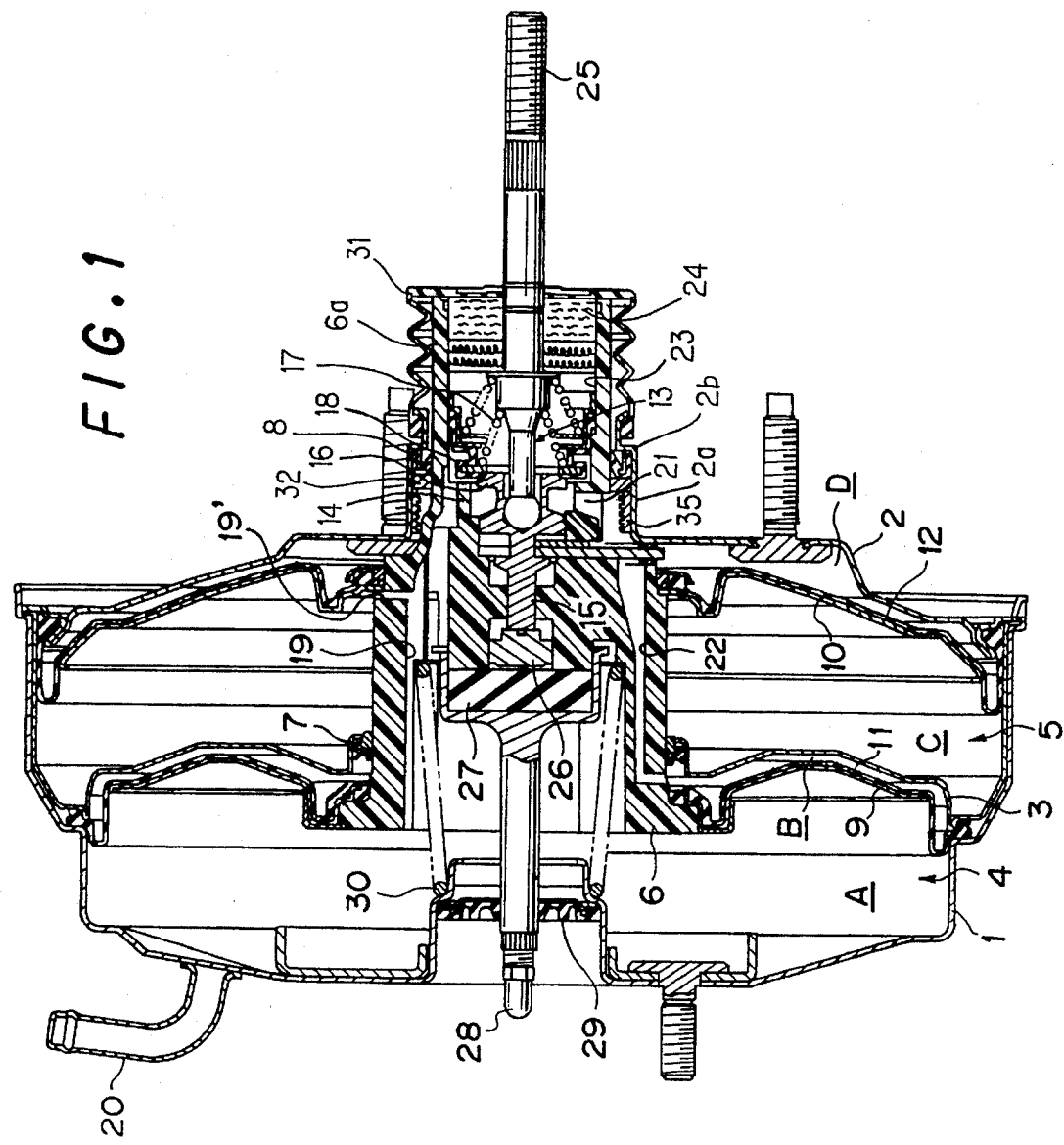
FIG. 1 is a longitudinal section of a first embodiment of the invention.

Several embodiments of the invention will now be described with reference to the drawings. Referring to FIG. 1, an enclosed vessel is formed by a front shell 1 and a rear shell 2, and a center plate 3 disposed centrally within the vessel divides the interior into a pair of front chamber 4 and rear chamber 5. A substantially tubular valve body 6 slidably extends through the axial portions of the rear shell 2 and the center plate 3, with annular seal members 7, 8 maintaining a hermetic seal.

A front power piston 9 and a rear power piston 10, disposed within the front chamber 4 and the rear chamber 5, respectively, are connected to the valve body 6, and a front diaphragm 11 and a rear diaphragm 12 are applied to the back surfaces of the power pistons 9, 10, respectively, thus defining a constant pressure chamber A and a variable pressure chamber B across the front diaphragm 11 and a constant pressure chamber C and a variable pressure chamber D across the rear diaphragm 12.

A valve mechanism 13 is effective to switch a fluid circuit between the pair of constant pressure chambers A, C and the pair of variable pressure chambers B, D, and is disposed within the valve body 6. Specifically, the valve mechanism 13 comprises an annular, first valve seat 14 formed on the inner peripheral surface of the valve body 6, an annular, second valve seat 16 formed on the right end of a valve plunger 15, which is slidably disposed within the valve body 6, at a location radially inward of the first valve seat 14, and a valve element 18 which is urged by a spring 17, from the right, as viewed in FIG. 1, so as to be seated upon either valve seat 14 or 16.

A space radially outward of an annular, first seat, defined by the contact between the first valve seat 14 and the valve element 18, communicates with the constant pressure chambers C and A through axial constant pressure passages 19 and 19' formed in the valve body 6, and a chamber A communicates with an intake manifold of an engine through a tubing 20 which introduces a negative pressure.

A space located radially inward of the first seat defined by the contact between the first valve seat 14 and the valve element 18, but radially outward of an annular, second seat defined by the contact between the second valve seat 16 and the valve element 18, or a space located intermediate the first and the second seat, communicates with a variable pressure chamber D through a variable pressure passage 21 formed in the valve body 6, and the chamber D in turn communicates with the variable pressure chamber B through an axial variable pressure passage 22 also formed in the valve body 6.

Finally, a space located radially inward of the second seat defined by the contact between the second valve seat 16 and the valve element 18 communicates with the atmosphere, which acts as a source of pressure fluid, through a pressure passage 23 in which a filter 24 is disposed.

The right end of the valve plunger 15 is pivotally connected to the distal end of an input shaft 25, the other end of which is connected to a brake pedal, not shown. On the other hand, a plunger plate 26 and a reaction disc 27 are sequentially disposed to the left of the valve plunger 15, with the reaction disc 27 being fitted in the right end of a push rod 28.

The left end of the push rod 28 slidably extends through the axial portion of the front shell 1, with a seal member 29 interposed therebetween, and projects to the exterior for connection with the piston of a master cylinder, not shown. The valve body 6 is normally maintained in its inoperative position shown by a return spring 30.

The valve body 6 includes a tubular terminal portion 6a, which projects axially rearward through a stepped tubular portion 2a formed in the axial portion of the rear shell 2, with the tubular terminal portion 6a extending out of the opening being covered by a dust cover 31 which is formed of rubber. As shown to an enlarged scale in FIG. 2, the seal member 8 mentioned above is disposed within the tubular portion 2a to provide a seal between the rear shell 2 and the tubular terminal portion 6a of the valve body 6.

A bearing 32 for guiding the tubular terminal portion 6a of the valve body 6 is disposed forwardly of the seal member 8, and the seal member 8 is held sandwiched between the bearing 32 and a reduced diameter portion 2b formed on the tubular portion 2a of the rear shell 2. The bearing 32 is held by a retainer 33, which is a press fit around the tubular portion 2a of the rear shell 2 and inserted from the front side, against withdrawal in the forward direction.

It is to be understood that the booster mentioned above is similar to a conventional arrangement known in the art, and when inoperative, an opening into the variable pressure chamber D of the variable pressure passage 21 which is formed in the valve body 6 is located opposite to the internal surface of the tubular portion 2a of the rear shell 2.

Figure 2:
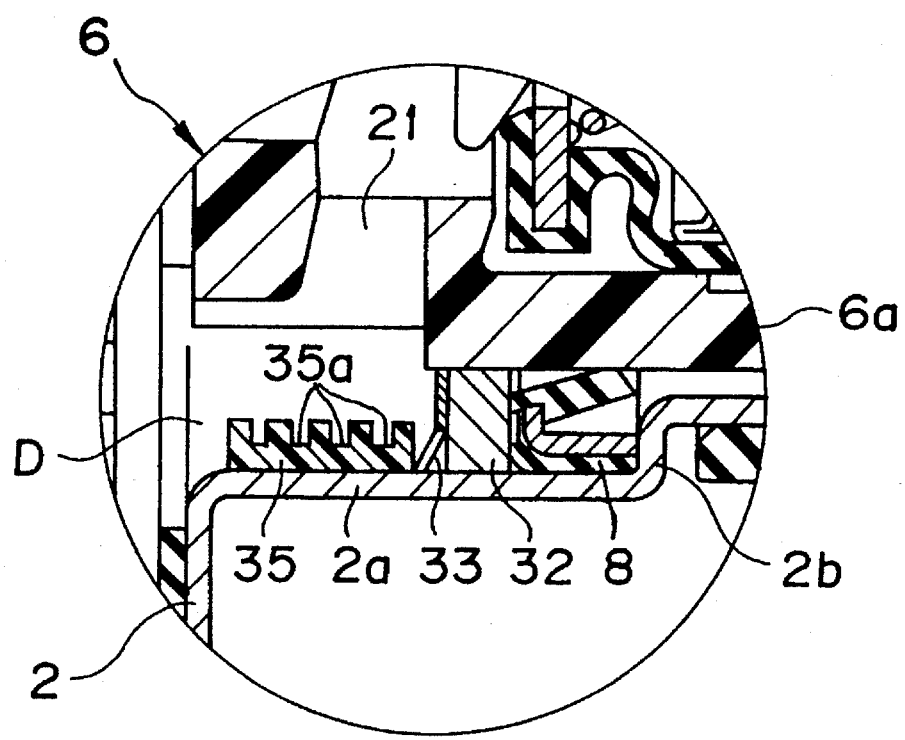
FIG. 2 is a section, to an enlargement, of a fragment shown in FIG. 1.

Also as shown in FIG. 2, in the present embodiment, an annular member 35, formed of synthetic resin, is fixed by a press fit against the internal surface of the tubular portion 2a of the rear shell 2, and the inner peripheral surface of the annular member 35 is formed with a plurality of circumferentially extending annular grooves 35a, thus defining an uneven surface. In the embodiment shown, the annular grooves 35a extend in a direction orthogonal to the axial direction, but they may be formed at an angle with respect to the axis or alternatively, the uneven surface may be formed by a plurality of axially extending grooves. Additionally, grooves disposed in a grid configuration or a number of random unevenness may be used to define such an uneven surface.

In-operation, when a brake pedal, not shown, is depressed to drive the input shaft 25 and its connected valve plunger 15 integrally forward, the valve element 18 is also driven forward in an integral manner while it is seated upon the second valve seat 16 until the valve element 18 becomes seated upon the first valve seat 14 formed on the valve body 6, whereupon the communication between the variable pressure passages 21, 22 and the constant pressure passages 19, 19' is interrupted. As the input shaft 25 and the valve plunger 15 continue to be driven forward, the valve element 18 which has been seated upon the first valve seat 14 and hence is prevented from moving forward moves away from the second valve seat 16, whereby the pressure fluid is introduced from the pressure passage 23 into the variable pressure chambers B, D through the variable pressure passages 21 and 22.

Since the uneven surface is defined on the internal surface of the tubular portion 2a of the rear shell 2 at a location opposite to the opening of the variable pressure passage 21 into the variable pressure chamber D when the booster is inoperative, this acts to reduce sounds generated as a result of the impingement of the pressure fluid against the uneven surface as it is injected from the variable pressure passage 21 into the variable pressure chamber D, thus reducing the generation of sounds during the suction stroke. Stated differently, if the internal surface of the tubular portion 2a were not formed with an uneven surface, but is formed as a smooth surface, the sounds generated as a result of the impingement of the pressure fluid will be much greater.

Since the uneven surface does not present any resistance whatsoever to the passage of the pressure fluid as compared with the sound producing material which has been disposed within the pressure passage in the prior art, no sacrificing of the response occurs.

OTHER EMBODIMENTS

Figure 3:
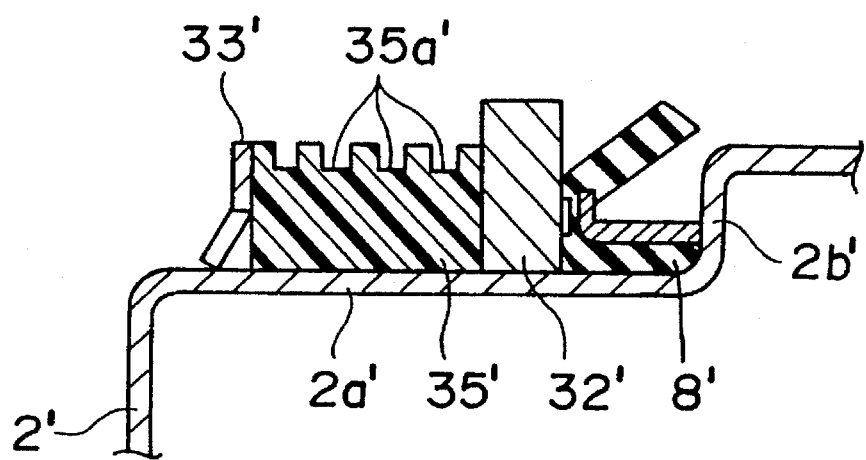
FIG. 3 is a similar section of part of a second embodiment according to the invention.

FIG. 3 shows a modification of the first embodiment mentioned above in which the location of the retainer 33 and the annular member 35 is interchanged. Specifically, in this modification, an annular member 35' is not fixed by a press fit around a tubular portion 2a' of a rear shell 2', but is prevented from being withdrawn in the forward direction, by a retainer 33'. In this modification, parts corresponding to those shown in the first embodiment are designated by like reference numerals which are primed.

Figure 4:
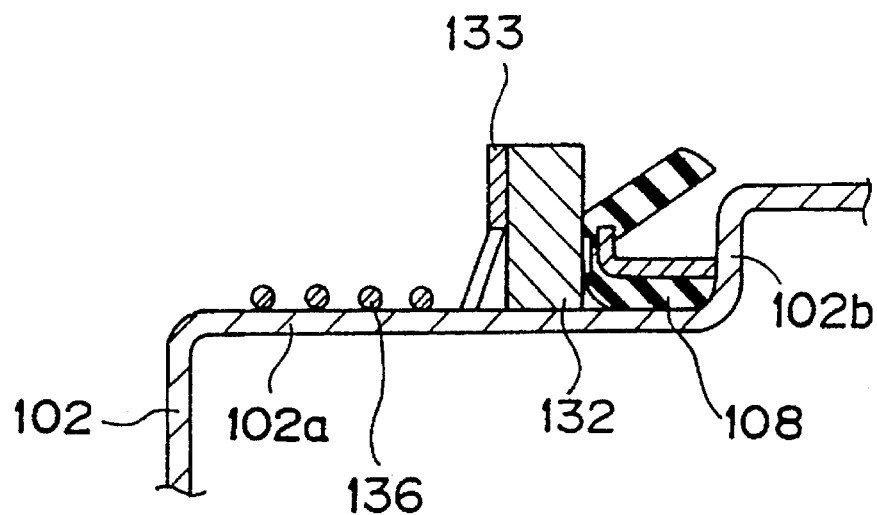
FIG. 4 is a similar section of part of a third embodiment according to the invention.
Figure 5:
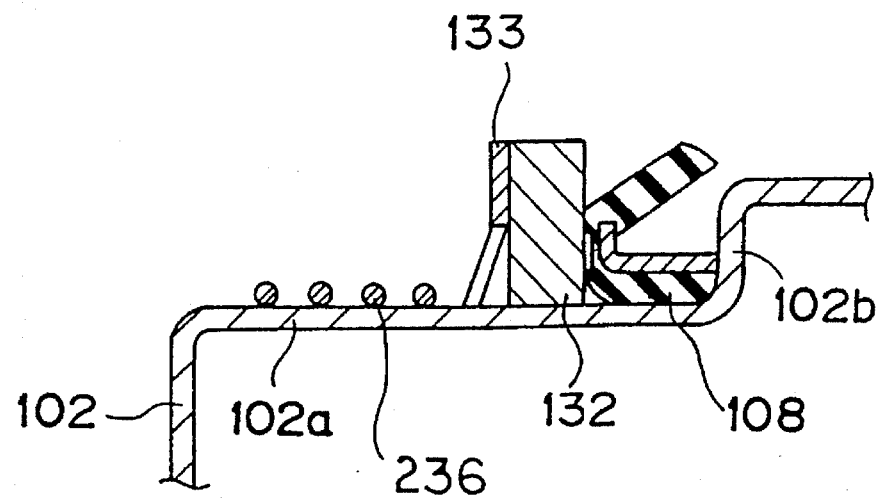
FIG. 5 is a similar section of part of a fourth embodiment according to the invention.

FIGS. 4 and 5 show further embodiments in which the annular member 35 shown in the first embodiment is replaced by a plurality of rings 136 (FIG. 4) or coiled springs 236 (FIG. 5) which are fixed by a press fit into a tubular portion 102a of a rear shell 102. The plurality of rings 136 or coiled springs 236 define an uneven surface on the internal surface of the tubular portion 102a. Again, parts corresponding to those shown in the first embodiment are designated by like reference numerals, to which 100 is added.

The boosters constructed in the manner illustrated in FIGS. 3, 4 and 5 achieve a similar functioning and effect as those achieved by the first embodiment.

While the invention has been shown and described above in connection with several embodiments thereof, it should be understood that a number of changes, modifications and substitutions therein will readily occur to one skilled in the art from the above disclosure without departing from the scope and spirit of the invention defined by the appended claims.

What is claimed is:

1. A booster including a shell which defines a constant pressure chamber and a variable pressure chamber and includes a tubular portion having an internal surface, a tubular valve body slidably disposed within the shell and having a terminal portion which projects externally through the tubular portion of the shell, a valve mechanism disposed within the valve body, a constant pressure passage for providing a communication between the valve mechanism and the constant pressure chamber formed in the shell, a variable pressure passage for providing a communication between the valve mechanism and the variable pressure chamber formed in the shell, and a pressure passage for providing a communication between the valve mechanism and a source of pressure fluid located externally of the shell, and in which the variable pressure passage has an opening to permit entry of the pressure fluid into the variable pressure chamber, the opening being disposed opposite to the internal surface of the tubular portion of the shell when the booster is inoperative, the internal surface of the tubular portion of the shell including means defining an uneven surface disposed in an opposing relation with the opening for reducing generation of sounds made by pressure fluid from the variable pressure opening impinging on the internal surface.

2. A booster according to claim 1 in which the tubular portion of the shell extends rearwardly and includes a rear portion having a stepped end face against which a seal member is fitted to provide a hermetic seal between an outer periphery of the valve body and an opposing inner periphery of the tubular portion of the shell, a bearing and a retainer being fitted around the tubular portion of the shell at a location forwardly of the seal member, the bearing being disposed forwardly of the seal member and the retainer being disposed forwardly of the bearing such that the bearing and the seal member are retained between the stepped end face and the retainer, the uneven surface being disposed in the tubular portion forwardly of the retainer.

3. A booster according to claim 2 in which the means defining the uneven surface comprise a portion of the internal surface disposed proximate the opening and a coiled spring fitted around the inner periphery of the tubular portion in a region disposed forwardly of the retainer, the uneven surface being defined by an outer surface of the coiled spring and the portion of the internal surface of the tubular portion disposed proximate the opening.

4. A booster according to claim 2 in which the means defining the uneven surface comprise a portion of the internal surface disposed proximate the opening and a plurality of rings fitted around the inner periphery of the tubular portion in a region disposed forwardly of the retainer, the uneven surface being defined by an outer surface of the plurality of rings and the portion of the internal surface of the tubular portion disposed proximate the opening.

5. A booster according to claim 2 in which the means defining the uneven surface comprise an annular member, formed of synthetic resin, which is disposed in press fit engagement around the inner periphery of the tubular portion in a region disposed forwardly of the retainer, the uneven surface being defined by an inner peripheral surface of the annular member.

6. A booster according to claim 5 in which the uneven surface includes a plurality of annular grooves and a plurality of axial grooves which are disposed in a grid configuration and are formed in the inner peripheral surface of the annular member.

7. A booster according to claim 1 in which the tubular portion of the shell extends rearwardly and includes a rear portion thereof having a stepped end face against which a seal member is fitted to provide a hermetic seal between an outer periphery of the valve body and an opposing inner periphery of the tubular portion of the shell, a bearing which is disposed forwardly of the seal member, a retainer which is disposed forwardly of the seal member and an annular member which is disposed forwardly of the retainer, each being fitted around the tubular portion of the shell, the uneven surface being formed by an inner peripheral surface of the annular member.

8. A booster according to claim 7 in which the uneven surface includes a plurality of annular grooves and a plurality of axial grooves disposed in a grid configuration which are formed in an inner peripheral surface of the annular member.

* * * * *